(12) United States Patent
Hammerbeck

(10) Patent No.: US 6,508,733 B2
(45) Date of Patent: Jan. 21, 2003

(54) VARIABLE SPEED DRIVE

(76) Inventor: John Philip Roger Hammerbeck, Rawlings House, 2a Milner Street, London SW3 2PU (GB)

( * ) Notice: Subject to any disclaimer, the term of this patent is extended or adjusted under 35 U.S.C. 154(b) by 0 days.

(21) Appl. No.: 09/815,821

(22) Filed: Mar. 23, 2001

(65) Prior Publication Data

US 2001/0031679 A1 Oct. 18, 2001

Related U.S. Application Data

(63) Continuation of application No. PCT/GB99/03198, filed on Sep. 24, 1999.

(30) Foreign Application Priority Data

Sep. 25, 1998 (GB) .............................................. 9820984

(51) Int. Cl.⁷ .................................................. F16G 1/18
(52) U.S. Cl. ....................................................... 474/239
(58) Field of Search ................................ 474/239, 237, 474/144, 148

(56) References Cited

U.S. PATENT DOCUMENTS

| 1,214,911 | A | * | 2/1917 | Granz | 474/239 |
|---|---|---|---|---|---|
| 1,667,120 | A | * | 4/1928 | Keiser | 474/237 |
| 2,251,772 | A | * | 8/1941 | Zuber | 474/239 |
| 2,307,192 | A | * | 1/1943 | Boeye | 474/239 |
| 2,578,012 | A | | 12/1951 | McGihon | |
| 4,088,036 | A | | 5/1978 | Hillman | |
| 4,259,874 | A | | 4/1981 | Guirriec | |
| 5,277,668 | A | | 1/1994 | Pohn | |
| 5,957,797 | A | * | 9/1999 | Hong | 474/148 |

FOREIGN PATENT DOCUMENTS

| CH | 86615 | | 8/1919 | | |
|---|---|---|---|---|---|
| CH | 657683 | | 9/1986 | | |
| GB | 2049844 | | 12/1980 | | |
| GB | 2142411 | | 1/1985 | | |
| GB | 2172686 | | 9/1986 | | |
| JP | 57192665 | | 11/1982 | | |
| JP | 63-115940 | * | 5/1988 | ............. | F16G/9/00 |
| JP | 6-117504 | * | 6/1994 | ............. | F16H/7/00 |
| SU | 2016291 | | 3/1989 | | |

* cited by examiner

*Primary Examiner*—Thomas R. Hannon
*Assistant Examiner*—Timothy McAnulty
(74) *Attorney, Agent, or Firm*—Price, Heneveld, Cooper, DeWitt & Litton

(57) ABSTRACT

A variable speed drive comprising two drives, an output drive wheel and an endless, extendible member that is driven by the drives and extends around and rotates the output drive wheel. The drives are operable to move the endless member around an endless path at a first speed at a first driving position and at a second speed at a second position. This causes local expansion or contraction of the endless member around the output drive wheel and so varies its speed.

42 Claims, 13 Drawing Sheets

VARIABLE SPEED DRIVE

CROSS-REFERENCE TO RELATED APPLICATIONS

This application is a continuation of PCT International Application No. PCT/GB99/03198 filed in the United Kingdom on Sep. 24, 1999 designating the United States of America, which was published in English on Apr. 6, 2000 and which claims priority to British Patent Application No. 9820984.4 filed Sep. 25, 1998.

BACKGROUND OF THE INVENTION

The present invention relates to a variable speed drive.

One known variable speed drive comprises a motor for driving a continuous drive belt that is wound around and movable along an external surface of a circular pyramid. Mounted on the pyramid is the drive's output shaft. In this arrangement, when the belt is driven around a wide end of the pyramid it causes the pyramid, and so the output shaft, to rotate at a particular speed. By moving the belt towards the apex of the pyramid, the speed at which the pyramid rotates increases. Hence, by suitable positioning the belt relative to the surface of the pyramid, the speed of the output shaft can be varied.

A problem with this drive is that it is not efficient. Another problem is that it is bulky in three dimensions and complex in operation. Whilst various other, more efficient variable speed drives are available, they tend to be complex and expensive.

SUMMARY OF THE INVENTION

An object of the present invention is to provide a low cost, low weight and energy efficient variable speed drive.

According to one aspect of the present invention there is provided a variable speed drive comprising a drive, a movable member, an output drive and an endless, extendable, member that extends around the output drive and the movable member, and is driven by the drive, wherein movement of the endless member around the output drive causes said output drive to move and movement of the movable member causes the endless member to expand or contract, thereby varying its overall length, and so varying the speed at which the output drive is driven.

Preferably, two spaced apart movable members are provided, the endless member being located between them, the two members being fixedly mounted relative to each other and movable relative to the drive, such that when the movable members are moved in one direction the endless member is caused to engage a first one of the movable members and is able to move the output drive in a first direction, and when the movable members are moved in another direction the endless member is caused to engage a second one of the members and is able to move the output drive in a second direction, thereby to provide a reversible drive. Preferably, the or each movable member comprises a wheel.

Preferably, the drive comprises a hollow drive shaft. Preferably, the hollow drive shaft is driven by an electric motor. Drive means may be mounted on the hollow drive shaft for interacting with the endless, flexible member, thereby to move it.

Preferably, the endless, extendable member is an endless coil or spring. The endless member may comprise a belt or tube.

When the endless member is a spring or coil, preferably the drive means comprises a lug that depends from an internal wall of the hollow drive shaft for locating between adjacent windings of the spring or coil, so that when the hollow drive shaft is rotating the spring is propelled forward by engagement of successive windings with the rotating lug. Preferably, a pair of lugs is provided, each lug of the pair being between adjacent windings of the spring but offset from the other in such a manner that a first one of the pair contacts a forward one of the adjacent windings and the second one of the pair contacts a rearward one of the windings.

Preferably, two or more lugs are provided opposite each other. This is advantageous because it keeps the spring positioned centrally in the hollow drive shaft. The opposing lugs are preferably positioned so that the angle of incidence of each lug to a winding of the spring or coil can be prevented from becoming too steep. Preferably, each lug is provided with a roller bearing that provides a surface for engagement with the windings of the spring, thereby to reduce the effects of friction.

Preferably, sets of lugs are provided at opposing ends of the hollow drive shaft. This is advantageous because the part of the spring that is between the lugs is substantially unaffected by movement of the or each movable member so that the part that is effected is reduced. This means that the movable member does not need to be moved as far as would otherwise be necessary.

Preferably, a drive wheel is provided on the output shaft, the flexible member being wound around the drive wheel.

Preferably, a detector is provided for detecting expansion or contraction of the endless member, and thereby changes in the speed of the output drive. When the endless member is a spring, preferably the detector is operable to monitor separation of its adjacent windings, thereby to gain a measure of the expansion or contraction of the spring and so its speed. By comparing the separation of the windings of the spring or coil on either side of the output drive, the actual rate of power transmitted can be calculated.

Preferably, a controller is provided for controlling movement of the movable member. Preferably the controller is in communication with the detector so that information relating to a measured speed can be fed back to the controller.

According to another aspect of the present invention there is provided a variable speed drive comprising drive means, an output drive and an endless, extendible member that is driven by the drive means and extends around and drives the output drive, wherein the drive means is operable to drive the endless member at a first speed at a first driving point and means are provided for changing the speed or stopping movement of the endless member at a second point, thereby to cause expansion or contraction of the endless member around the output drive.

The means for changing the speed or stopping movement of the endless member may be operable to reduce the speed of the endless member to substantially zero at the second drive point, so that the endless member is substantially prevented from moving past that point.

Preferably, the endless, extendable member is an endless coil or spring. The endless flexible member may comprise a belt or tube.

When the endless member is a spring or coil, preferably the drive means comprises two hollow drive shafts located on opposing sides of the output drive. Preferably the hollow drive shafts are driven by the same motor.

Preferably, a lug depends from each hollow inner shaft for locating between adjacent windings of the spring or coil, so that when each hollow drive shaft is rotating, the spring is propelled forward by engagement of successive windings with the rotating lug. Preferably, a pair of lugs is provided, each lug of the pair being between adjacent windings of the spring but offset from the other in such a manner that a first one of the pair contacts a forward one of the adjacent windings and the second one of the pair contacts a rearward one of the windings.

Two or more lugs may be provided on opposing sides of the hollow drive. This is advantageous because it keeps the spring positioned centrally in the hollow drive shaft. The opposing lugs are preferably positioned so that the angle of incidence of each lug to a winding of the spring or coil can be prevented from becoming too steep. Preferably, the or each lug is provided with a roller bearing that provides a surface for engagement with the windings of the spring, thereby to reduce the effects of friction.

Preferably, sets of lugs are provided at opposing ends of the hollow drive shaft. This is advantageous because the part of the spring that is between the lugs is substantially unaffected by movement of the or each movable member so that the part that is effected is reduced. This means that the movable member does not need to be pulled as far as would otherwise be necessary.

Preferably, the hollow drive shafts each comprise an inner hollow cylindrical shaft that is releasably coupled to an outer hollow cylindrical shaft, which is driven by a motor. Preferably, the motor is a constant output motor.

Preferably, the means for changing the speed or stopping movement of the extendable member are operable to decouple the inner shaft from its outer shaft, so that the inner shaft no longer rotates and the spring is substantially prevented from moving past that point. Preferably, both of the hollow drive shafts are driven by the same motor.

The means for changing the speed or stopping movement of the extendable member may comprise a braking mechanism for braking movement of at least one of the inner shafts, thereby decoupling it from the corresponding outer shaft, so that the speed of the endless spring through that shaft can be reduced or even brought to zero.

The means for changing the speed or stopping movement of the extendable member may comprise a compression spring that is mounted between one end of the inner drive shaft and the same end of the outer drive shaft, wherein the compression spring is operable to pull the inner shaft into driving engagement with the outer shaft until a pre-determined tension of the endless member is reached, at which stage the pulling action of the member overcomes the pulling action of the compression spring, so that the inner shaft is moved out of engagement with the outer shaft.

Preferably, there is provided an actuator that is operable to sense when it is time to switch off the drive and move one of the inner shafts against the action of the compression spring and out of engagement with the outer shaft, thereby to decouple that inner shaft from the outer shaft in order to loosen off the spring. A detector may be provided to detect a loosening of the spring and switch off the motor that drives the outer shafts, thereby to return the drive to a starting position.

The inner shaft may have two separate but interlocking parts that can move longitudinally apart from each other, each of the parts being releasably mounted in driving engagement with the outer drive shaft, wherein the means for changing the speed or stopping movement of the endless member past the second point comprises means for moving the parts of the inner shafts from their driven position to a position in which they are de-coupled from the outer shaft. Preferably, the means for moving the parts of the inner shaft comprise elliptical wheels that are rotatable into engagement with the parts of the inner shaft and thereby push the parts away from each other and out of driving engagement with the outer shaft.

Preferably, a drive member is provided on the output drive, the flexible member being wound around the drive member, which drive member may be circular or, for example "pear" shaped or elliptical.

Preferably, a detector is provided for detecting the expansion or contraction of the flexible member, and thereby changes in the speed of the output drive. When the flexible member is a spring, preferably the detector is operable to monitor separation of its adjacent windings, thereby to gain a measure of the expansion or contraction of the spring and so its speed. By comparing the separation of the windings of the spring or coil on either side of the output drive, the actual rate of power transmittal can be calculated.

Preferably, a controller is provided for controlling movement of the movable member. Preferably the controller is in communication with the detector so that information relating to a measured speed can be fed back to the controller.

BRIEF DESCRIPTION OF THE DRAWINGS

Various systems in which the above mentioned aspects of the invention are embodied will now be described by way of example only and with reference to the following drawings.

DETAILED DESCRIPTION OF THE PREFERRED EMBODIMENT

Figure 1:
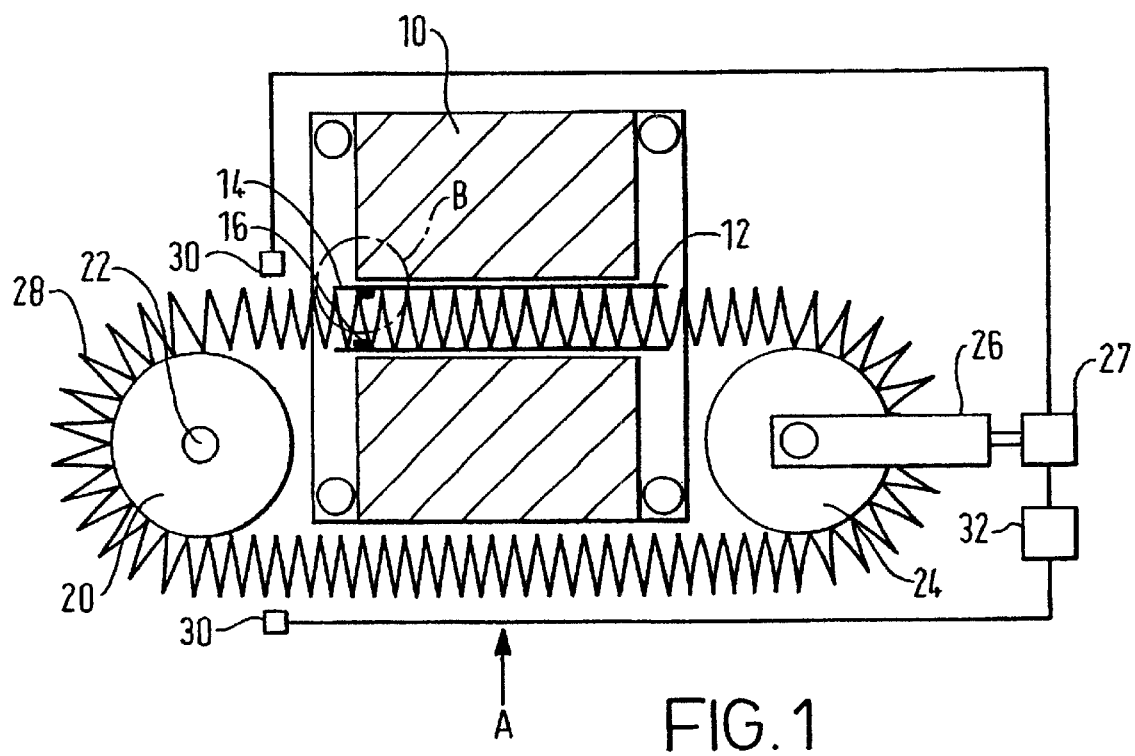
FIG. 1 is a diagrammatic, partially sectioned, representation of a variable speed drive system.
Figure 2:
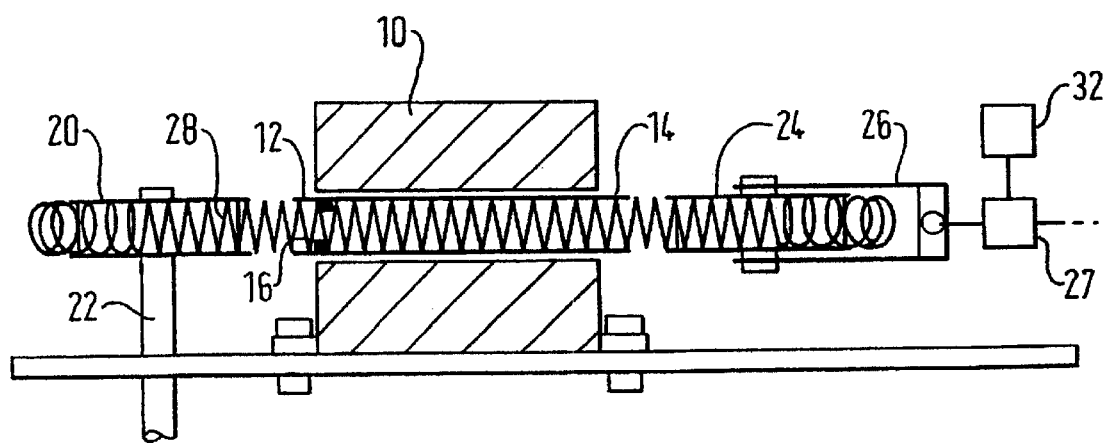
FIG. 2 is a side view of the drive system of FIG. 1, in the direction of arrow A.
Figure 3A:
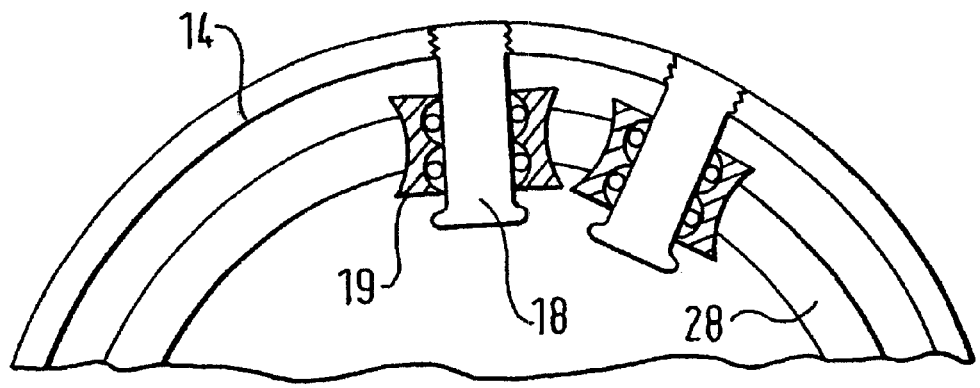
FIGS. 3a and 3b are exploded and sectioned views of the portion of FIG. 1 marked B.
Figure 3B:
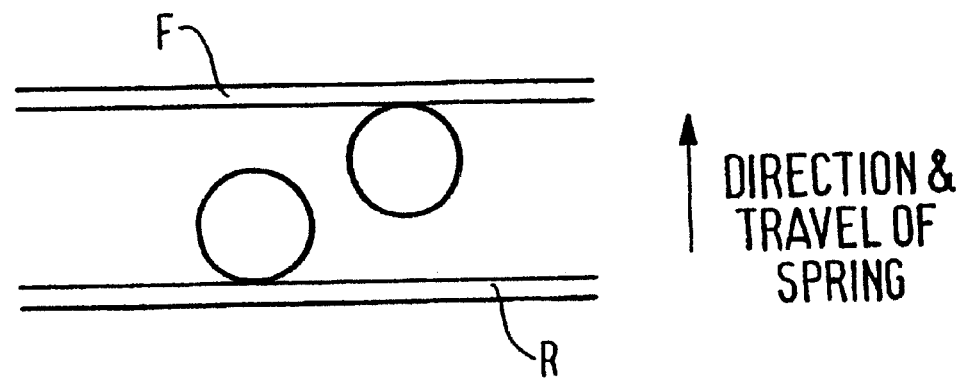
Figure 4:
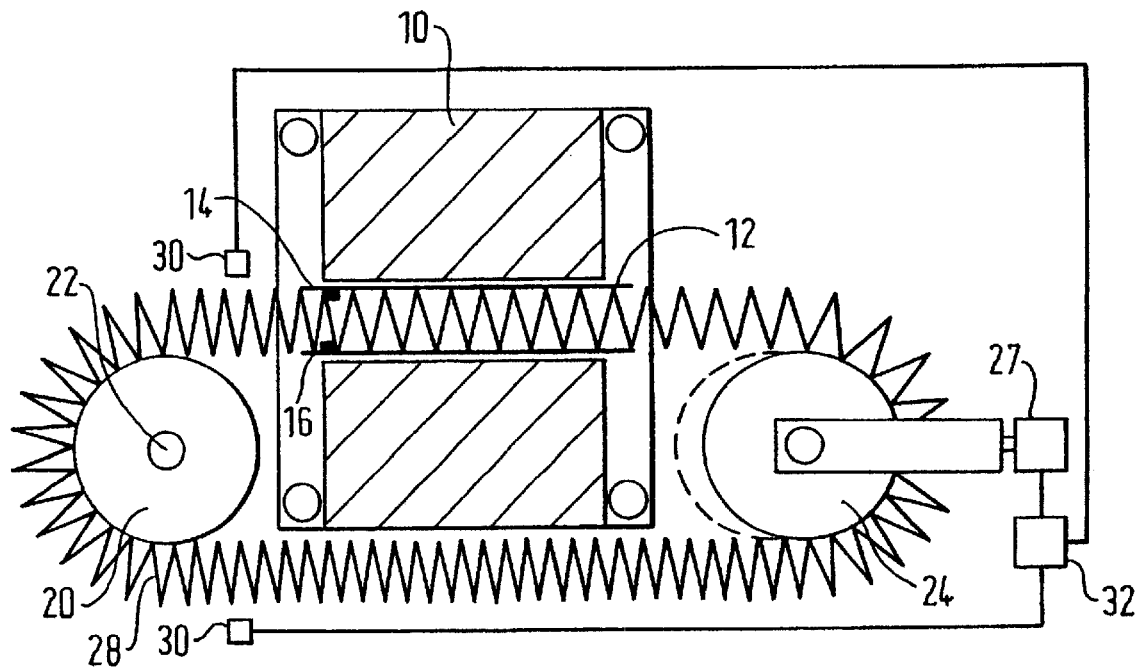
FIG. 4 is similar to FIG. 1 but shows the drive in a different configuration.

FIGS. 1, 2 and 4 show an electric motor 10 with a hollow drive shaft 12 that is operable to be rotated at a constant speed. Extending from an internal wall 14 of the hollow drive shaft 12 are opposing drive lugs 16. Each lug 16 comprises a cylindrical member 18 around which extends a roller bearing 20 (see FIG. 3a) to provide a bearing surface for limiting friction. The lugs 16 are typically provided in pairs, each lug of the pair being in close proximity to the other, but offset along the axis of the shaft, as shown in FIG. 3(b).

At opposing ends of shaft 12 and laterally offset from its axis, are a drive wheel 20 that is mounted on a drive shaft 22 and a movable tension wheel 24 that is rotatably mounted on a support 26 that is movable relative to shaft 12 and drive wheel 20 using a drive mechanism 27.

Extending through shaft 12 is an endless spring or coil 28 that winds around the movable tension wheel 24 and drive wheel 20. The shaft 12, the movable tension wheel 24 and the drive wheel 20 are arranged so that the spring 28 lies in substantially a single plane. Extending between adjacent windings of the spring are the pairs of lugs 16.

Spring 28 can be made of any suitable material, for example steel, and is arranged so that when the motor 10 is not switched on it is only lightly in contact with the drive lugs 16, the drive wheel 20 and the tensioning wheel 24.

When the motor 10 is running, i.e., the hollow drive shaft 12 is rotating, the movable tensioning wheel 24 is moved away from the motor 10 so that the spring 28 is stretched and gradually tensioned until it comes into contact with the drive wheel 20, as shown in FIG. 1. At this stage, a first one of the pair of lugs 16 contacts a forward one of the windings F and a second one of the pair contacts a rearward one of the windings R, as shown in FIG. 3b. Because the lugs 16 rotate with the hollow drive shaft 12, the spring 28 is propelled through the hollow shaft, with minimal frictional contact with the lugs 16, and each winding engages in turn with the roller bearing 19 of the drive lugs 16. In this way, the spring 28 is driven in an endless path through the shaft 12 and around tension wheel 24 and drive wheel 20. Given that the speed of rotation of the lugs 16 is constant, the spring 28 is advanced at a constant speed.

As will be appreciated, feeding the spring 28 around its endless path in this way causes rotation of the drive wheel 20, which in turn imparts torque to the drive shaft 22 causing it to rotate. In this way, the motor 10 drives the drive shaft 22 via the spring 28. It should be noted that the speed of the drive shaft 22 as it rotates is slightly higher than that of the spring 28 as it moves through hollow shaft 12.

In order to vary the speed at which the drive shaft 22 is rotating, the movable tension wheel 24 is moved relative to the motor 10. When the tension wheel 24 is moved away from the motor 10, as shown in FIG. 4, this causes the endless spring 28 to expand. The lengthening of the spring 28 causes it to move around its endless path faster, which in turn causes the drive wheel 20, and so shaft 22, to rotate at a faster rate. Hence, the speed of the drive 22 can be varied by increasing or reducing the length of spring 28.

On each of opposing sides of the drive wheel is a detector 30 for monitoring the separation of adjacent windings of the spring 28. Each of these could be, for example, a simple photo-detector or a detector that generates magnetic pulses each time a winding passes it. Alternatively, the passing of windings of the spring could be monitored mechanically using, for example, a movable wheel that engages the spring and is moved by varying the spring's tension. Because increases in the output of the drive cause the winding separation to vary on either side of the drive wheel 20, this allows the torque output to be automatically monitored.

Connected to each detector 30 is a controller 32 that is connected to the mechanism 27 for driving the movable tension wheel 24. Signals indicative of the torque of the drive wheel 20 are sent from the detector 30 to the controller 32. The measured torque is then compared to a desired torque. If the measured torque and the desired torque are not the same, then the controller 32 sends a signal to the drive mechanism 27 to move the tension wheel 24 thereby to vary the speed of the spring 28 and so the drive wheel 20 accordingly. In this way, the output torque can be varied.

Using a standard industrial, steel, spring coil, the variable speed drive system of FIGS. 1 and 2 can provide a drive wheel/spring speed ratio of typically six. Higher ratios can be achieved by linking together a plurality of the drives of FIGS. 1 and 2. For example, linking three of these drives would provide a ratio of two hundred and sixteen, i.e. six times six times six.

Figure 5:
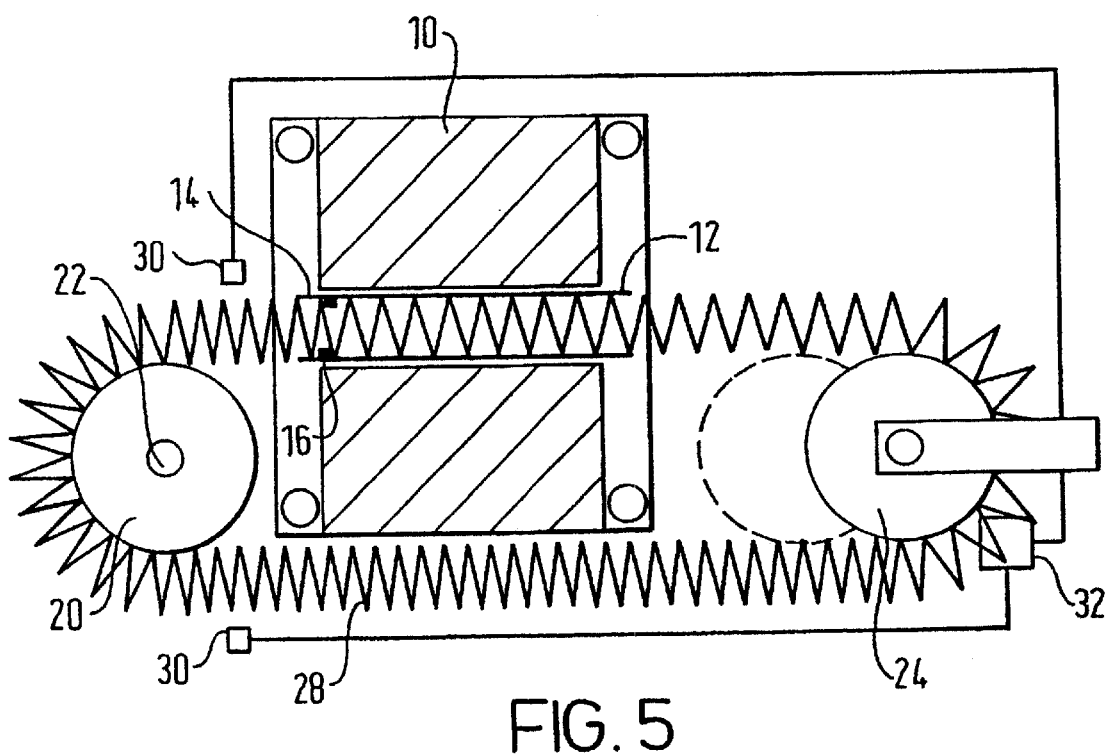
FIG. 5 is a diagrammatic, partially sectioned, representation of a modified version of the variable speed drive system of FIG. 1.

FIG. 5 shows a modified version of the drive of FIGS. 1 and 2. In this, opposing pairs of drive lugs 16 are provided at each end of drive shaft 12. In use, when the movable wheel is moved from its at rest position (indicated by the dotted line in FIG. 5) to an extended position, the portion of the spring between the lugs at either end of shaft 12 is substantially unaffected. In this way, the effective length of the spring is reduced and the movable wheel 24 does not have to be moved as far to provide the same output speed as would be the case were the spring to be expanded over its entire length. This can be advantageous where, for example, a compact drive is desired.

Figure 6:
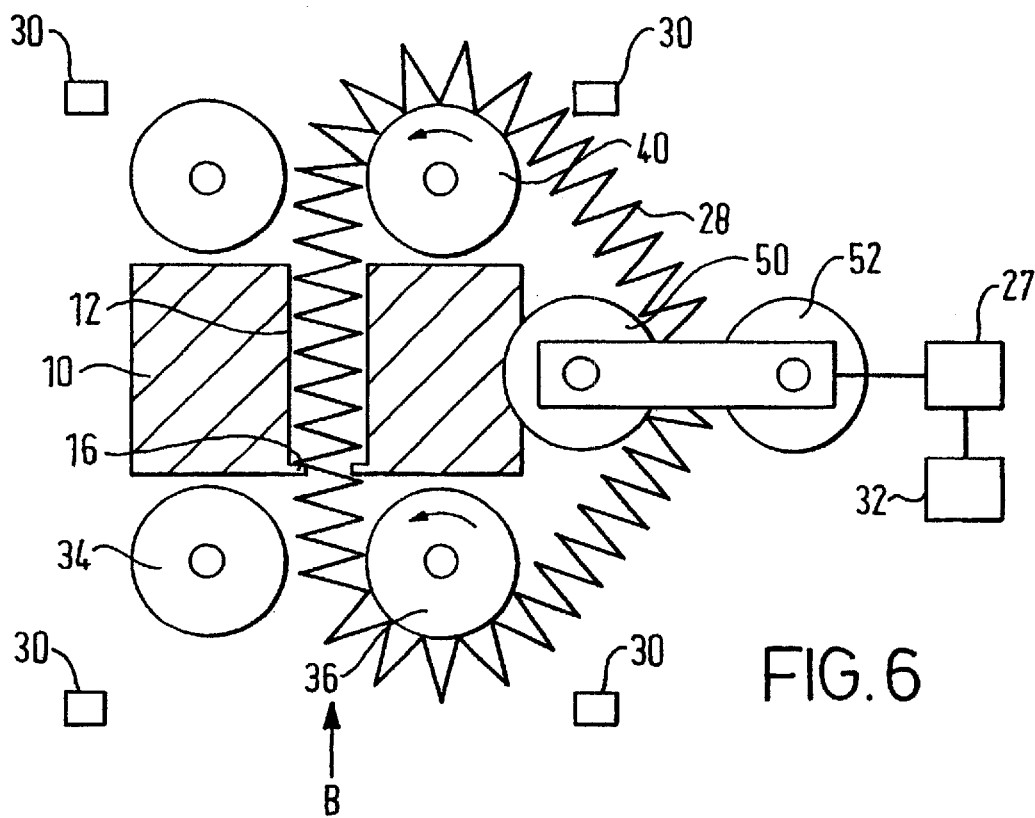
FIG. 6 is a schematic, partially sectioned, representation of a variable speed drive that can be reversed.

FIG. 6 shows another variable speed drive system. In this case, the system is reversible so that torque can be imparted to the drive shafts in opposite directions. As with the system described with reference to FIGS. 1 and 2, the system of FIG. 6 comprises an electric motor 10 with a hollow drive shaft 12 from which depends drive lugs 16 and through which extends and endless spring 28.

At opposing ends of the hollow drive shaft 12 are provided two pairs of symmetrically placed drive wheels 34 and 36 and 38 and 40. The wheels of each pair 34, 36 and 38, 40 are located on opposite sides of the axis of the hollow drive shaft 12. Extending from each wheel is a shaft 41 at the end of which is a smaller unifying wheel 42, 44. The unifying wheels 42, 44 of each pair are connected using a drive belt 46 that combines their output to produce a combined output torque.

Figure 7:
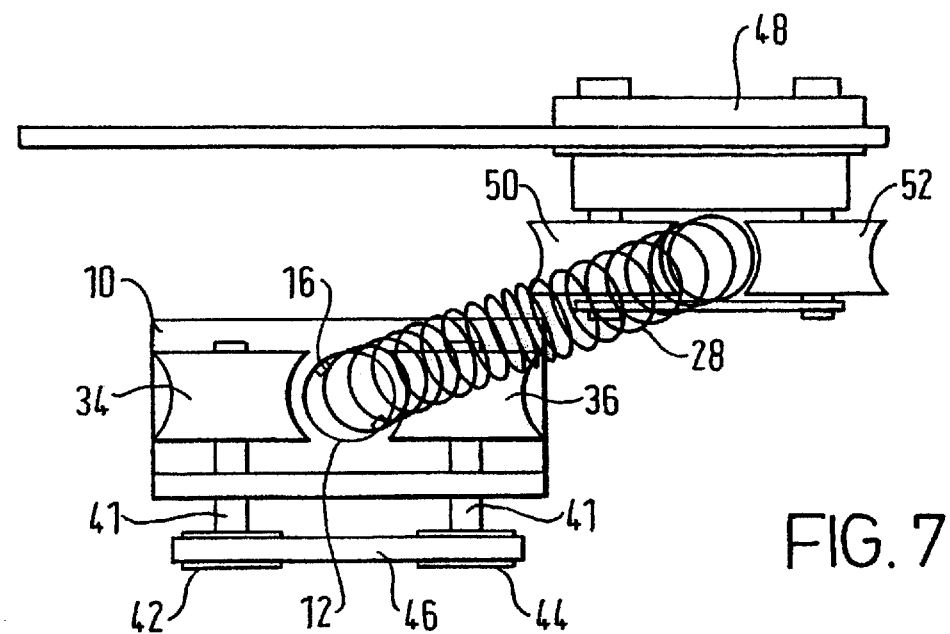
FIG. 7 is a side view of the drive system of FIG. 6 in the direction of arrow C.

Mounted above the motor and the drive wheels 34, 36, 38 and 40 is a movable gantry 48 that carries a pair of opposing movable tension wheels 50 and 52 on a single support 54, as shown in FIG. 7. In this way, the movable wheels 50 and 52 are fixedly mounted relative to each other and can be moved together relative to the motor. The gantry 48 is positioned so that the tension wheels 50 and 52 can be moved transversely back and forwards above the level of the motor 10 and drive wheels 34, 36, 38 and 40 and generally perpendicular to the axis of the hollow drive shaft 12. Extending around one of the movable tension wheels 50 and 52 in FIG. 4 is the spring 28.

When the drive 10 is in the configuration shown in FIG. 6, feeding the spring 28 around its endless path causes rotation of drive wheels 36 and 40, which imparts torque to their respective shafts 41 causing them to rotate in a first direction. As before, the speed of the drive shafts 41 is slightly higher than that of the spring 28 as it moves through hollow shaft 12.

In order to vary the speed at which shafts 41 are rotating, the gantry 48 and so movable tension wheels 50 and 52 are moved relative to the motor 10. When the tension wheel 50 is moved away from the motor 10, this causes the endless spring 28 to expand causing it to move around its endless path faster, which in turn causes the drive wheels 36 and 40 to rotate at a faster rate. Hence, the speed of the drive can be varied by increasing or decreasing the length of the spring 28.

Figure 8:
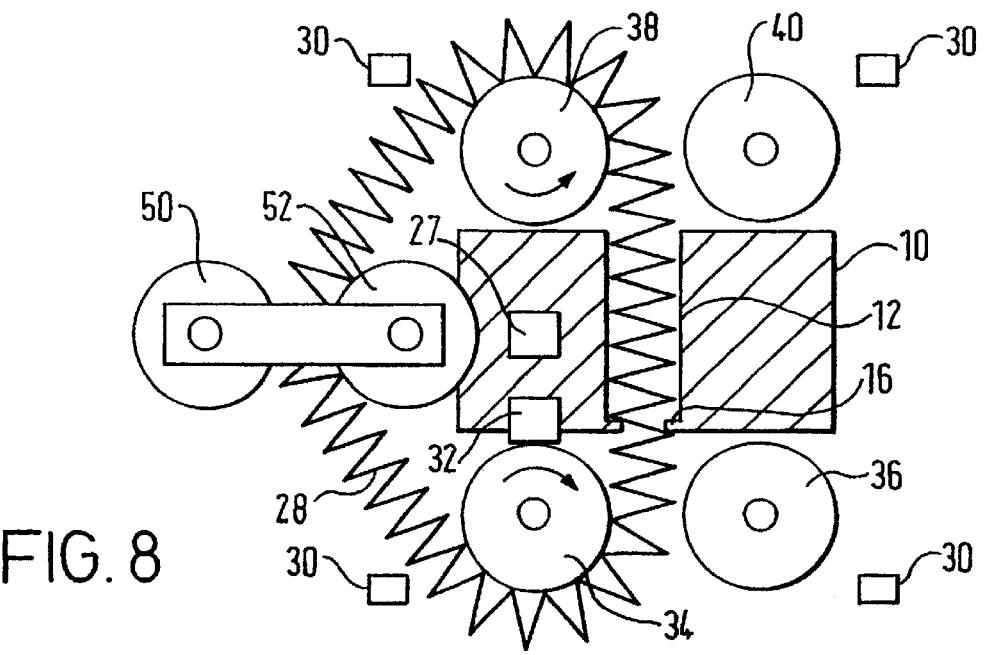
FIG. 8 is a schematic view similar to that of FIG. 8 in which the drive is shown in its reversed position.

If it is desired to reverse the direction of operation, the movable tension wheels 50 and 52 are moved towards the motor 10 from their extended position, over the motor 10 and towards its opposing side. This causes the spring 28 to move out of engagement with the first movable tension wheel 50 and into engagement with the second moveable tension wheel 52 as shown in FIG. 8. Once in this position, feeding the spring 28 around its endless path causes rotation of the drive wheels 34 and 38, which in turn imparts torque to their respective shafts 41 causing them to rotate in a second direction opposite to the first direction. In this way, the direction of rotation of the output shafts 41 is reversed.

Between the forward and reverse positions, there is a neutral position in which neither of the tensioning wheels 50 and 52 is in contact with the spring 28.

Figure 9:
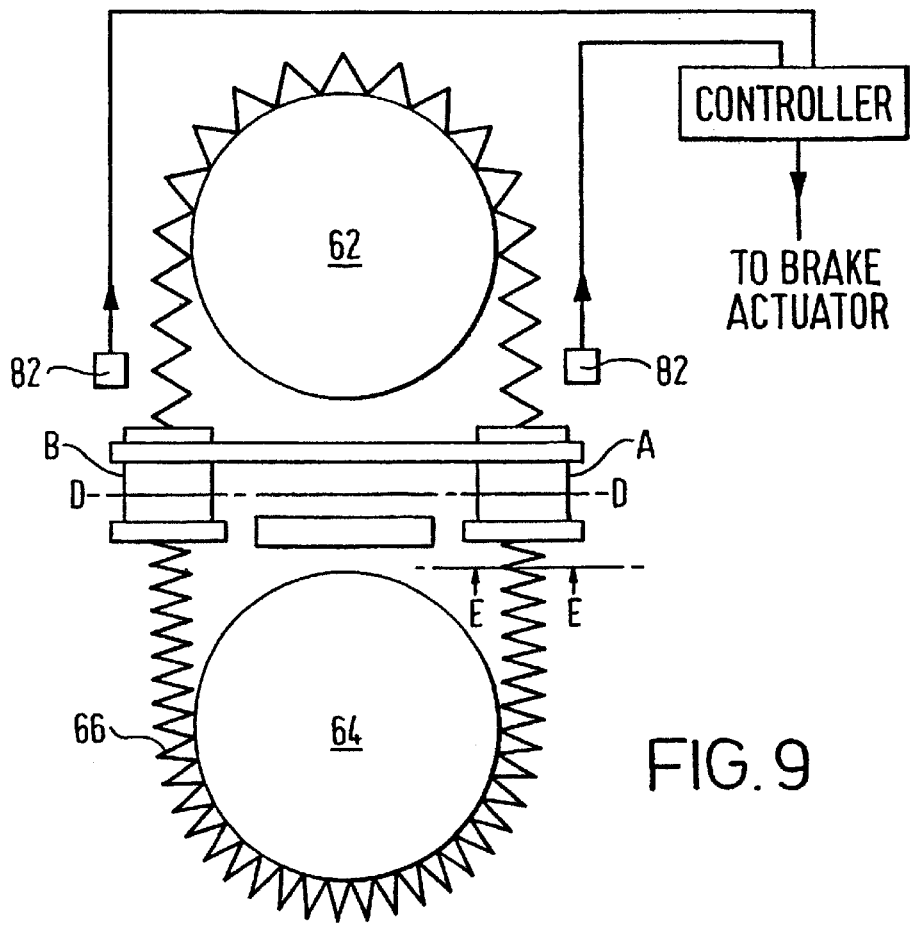
FIG. 9 is a diagrammatic plan view of another variable speed drive system.

FIG. 9 shoes another variable speed drive system that includes two opposing and substantially parallel hollow drive shafts A and B. Between the drive shafts A and B is a braking mechanism 60 that can, for example, be actuated hydraulically, and is adapted to act on either one of the shafts A or B as and when desired. At one end of the drive shafts A and B is provided an output drive wheel 62 and at the other end a guide wheel 64. Extending through each of the hollow shafts, around the output drive wheel and the guide wheel is an endless extendible member 66, in this case a spring. The arrangement is such that the portions of the spring that extend through the hollow drive shafts A and B are substantially parallel.

Figure 10:
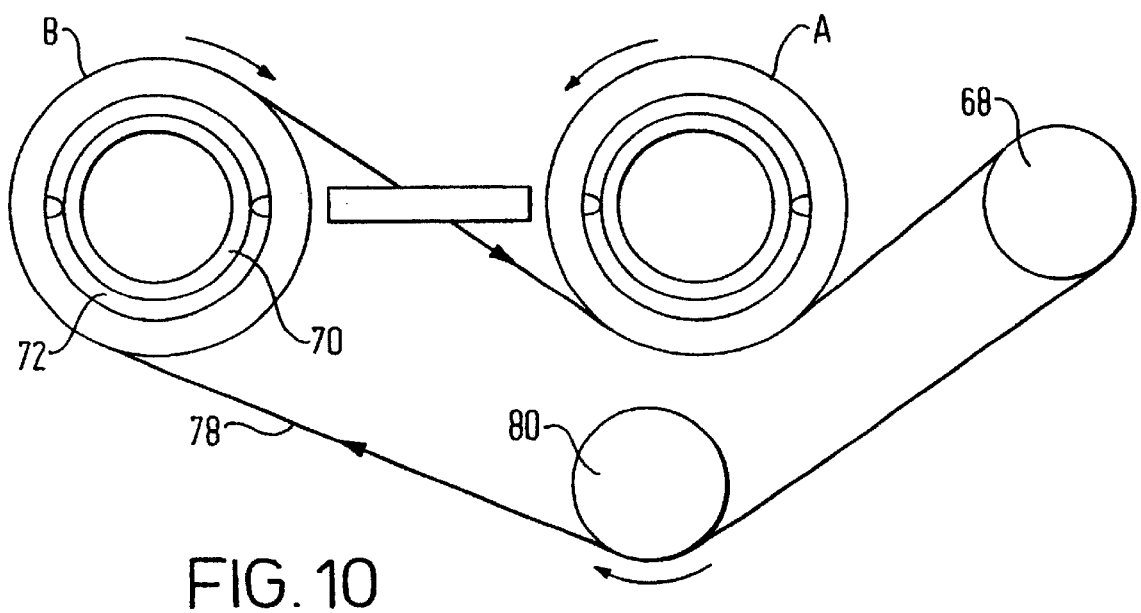
FIG. 10 is a section on the line D—D of the drive system of FIG. 9.
Figure 11:
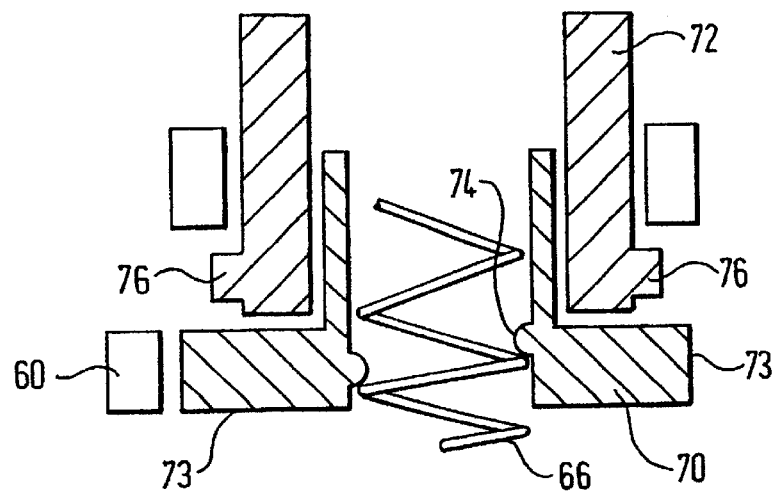
FIG. 11 is a view taken from the line E—E of FIG. 9.

Each of the hollow drive shafts A and B is driven by a single motor 68, as shown in FIG. 10. Each comprises a hollow inner shaft 70 that extends through a similarly hollow outer shaft 72, see FIG. 11, each shaft being movable relative to the other. As with the previously described embodiments, provided on an inner peripheral surface of the inner shafts of drive shafts A and B are lugs 74 that engage with the windings of the spring in use to drive it through the shaft. These lugs 74 are preferably provided in pairs, as shown in FIGS. 3a and 3b.

On an outer surface of each of the outer shafts 72 are provided cogs 76 that are adapted to engage with an endless toothed belt 78 that is connected to the driving motor 68. This toothed belt 78 extends around the drive of the motor 68 about towards a guide wheel 80, which guides it towards a lower end of the drive shaft B, as can be seen from FIG. 11. The belt extends partially around shaft B, partially around a lower end of the other drive shaft A and from there back to the driving motor 68. When the motor 68 drives its output shaft in a clockwise direction, shaft B is rotated clockwise but shaft A is rotated anti-clockwise. Hence, both of the outer shafts A and B are driven by a single motor 68 but in opposite directions.

On opposing sides and in the vicinity of the output wheel 62 are provided spacing detectors 82 for detecting the separation of adjacent windings of the spring 66. As before, each of these could be, for example, a simple photo-detector or a detector that generates magnetic pulses each time a winding passes it. Alternatively, the passing of windings of the spring could be monitored mechanically using, for example, a movable wheel that engages the spring and is moved by varying the spring's tension. Because increases in the output of the drive cause the winding separation to vary on either side of the drive wheel 20, detecting the separation of the windings on opposite sides of the output drive allows the torque output to be automatically monitored.

Figure 12:
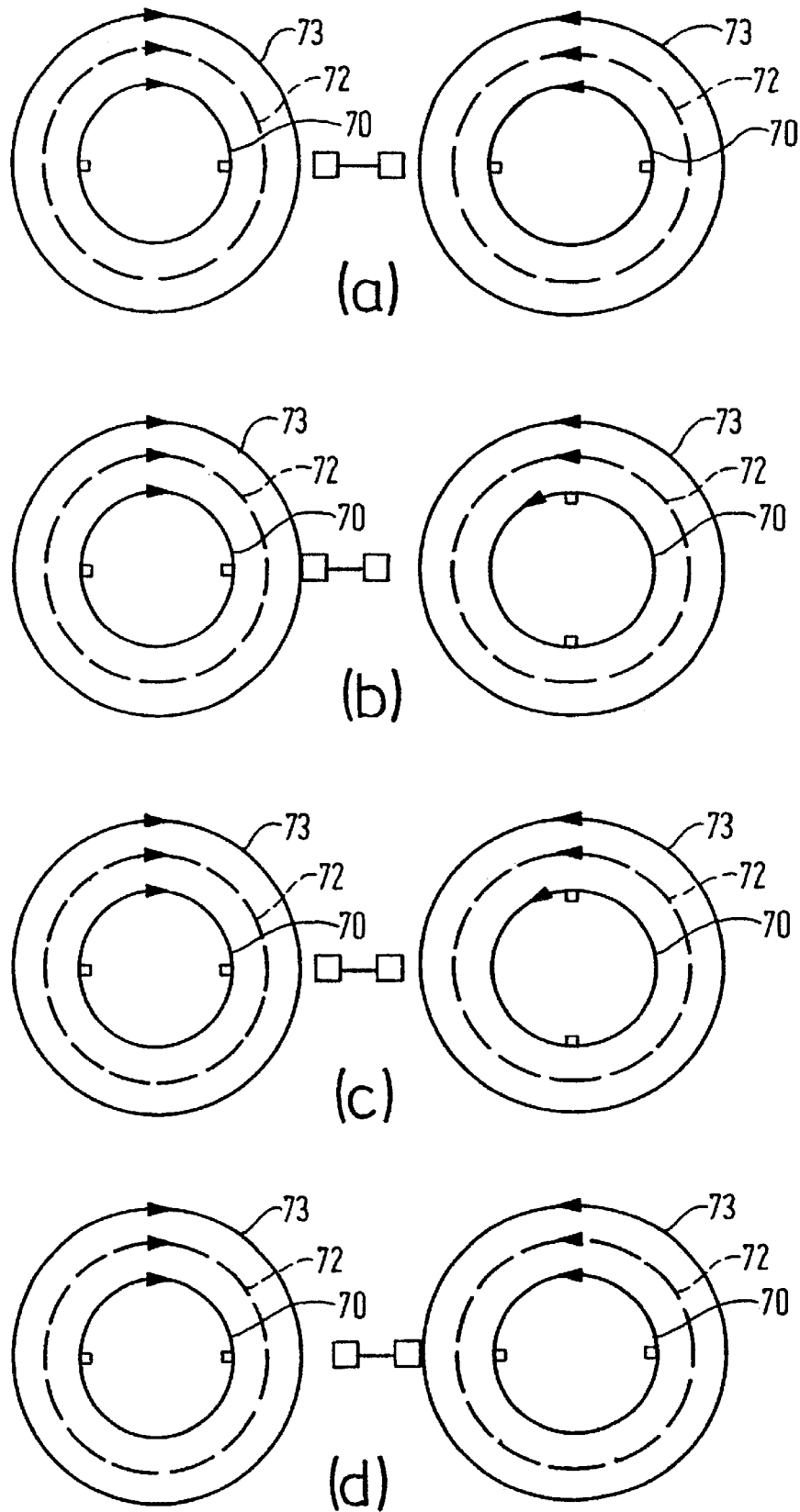
FIG. 12 shows the effects of braking the inner shaft of the drive system of FIG. 9.

In use, the motor 68 drives the outer shaft 72 of both of the hollow drive shafts. Frictional engagement between the inner and outer shafts 70 and 72, respectively, causes the inner shafts 70 to rotate with the outer shafts 72, as shown in FIG. 12a. This, in turn, causes the lugs 74 to rotate. Engagement of the lugs 74 with the endless spring 66 causes the spring 66 to be driven at one point by the hollow drive shaft A and simultaneously at another point by the second shaft B. If the speed of each shaft A, B is the same, this means that the speed at which the spring 66 moves is constant and the output wheel drive 62 is driven at a constant speed by its engagement with the spring 66. If, however, the brake 60 is applied to one of the inner shafts of the drives A or B, this creates a difference in the speeds at which the spring 66 is being driven at the two points. This causes a local expansion or contraction of the spring 66, which in turn causes a variation in the speed at which the output drive wheel 62 is driven.

For example, if the spring 66 of FIG. 9 were to be driven in a clockwise manner, application of the brake 60 to the flange 73 of the inner shaft of drive B would slow down or even stop movement of the inner shaft 70 as shown in FIG. 12b. This prevents movement of the spring 66 through shaft B. Since the rate of movement of the spring 66 through shaft A is unchanged, however, this causes a shortening of the spring 66 on the drive wheel 62 and so a local increase in the tension of the spring 66, thus causing an increase in the speed of the drive wheel 62. When the brake 60 is removed from the flange 73 of the inner shaft 72 of drive B, the hollow drive shafts A and B again run synchronously and the spring 66 returns to its equilibrium position, as shown in FIG. 12c.

In contrast, were the brake 60 to be applied to the flange 73 of shaft A, as shown in FIG. 12d, this would prevent rotation of its inner shaft 70. Since the rate of movement of the spring 66 through shaft B would be unchanged, however, this causes a lengthening of the spring 66 on the output drive wheel 62 and so a local decrease in the tension of the spring 66. In this way, the speed of the wheel 62 is decreased.

By driving the spring 66 at a given speed at one point on one side of the output drive wheel 62 and changing its speed or stopping movement on the other side of the wheel, it can be seen that the output speed of the drive system of FIG. 9 can be varied.

Figure 13:
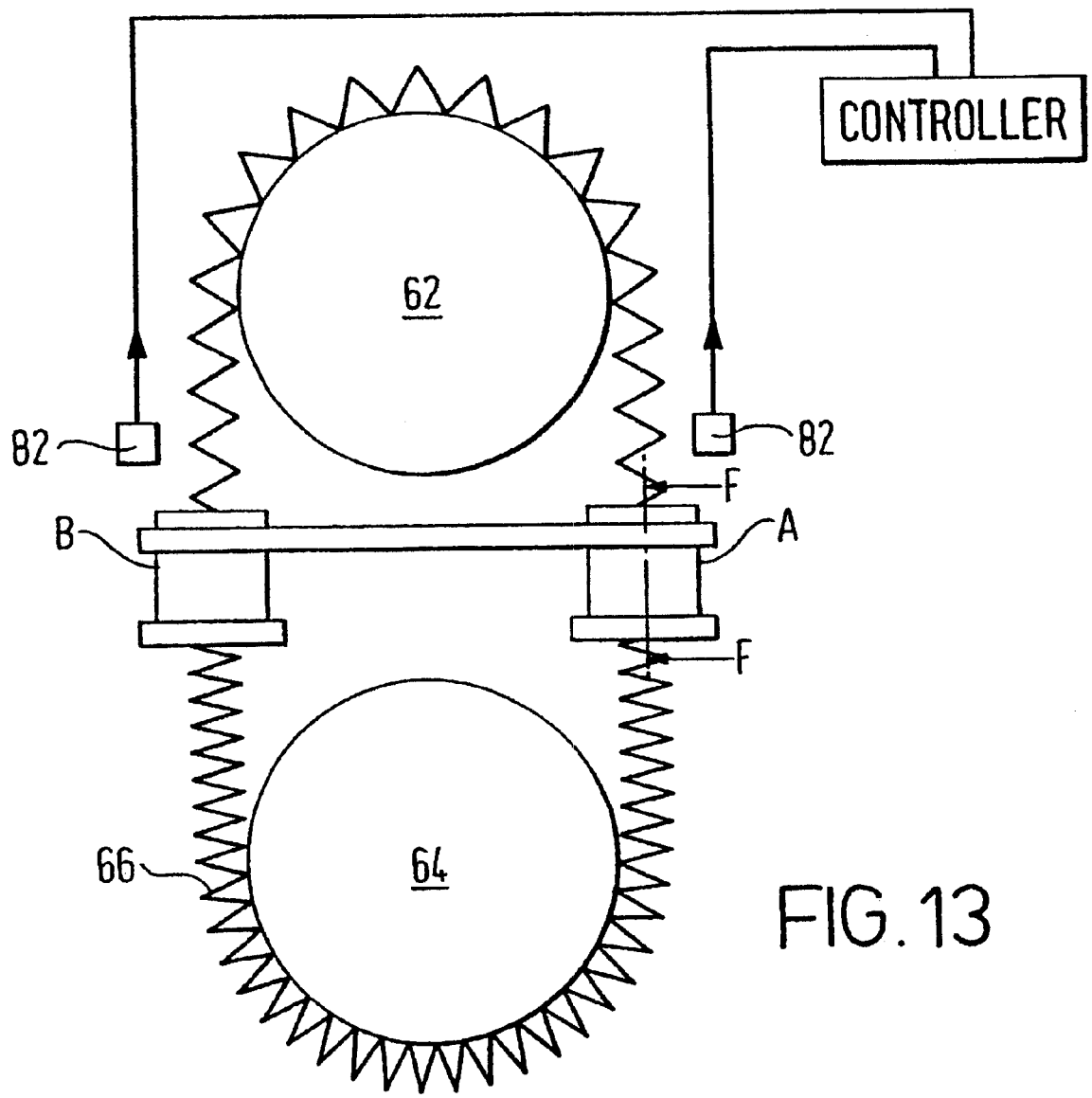
FIG. 13 is a diagrammatic plan view of yet another variable speed drive system.

FIG. 13 shows an alternative arrangement to that of FIG. 9. This has a similar overall layout, but does not include the braking mechanism. The specifics of the hollow drive shafts A and B are also different.

Figure 14:
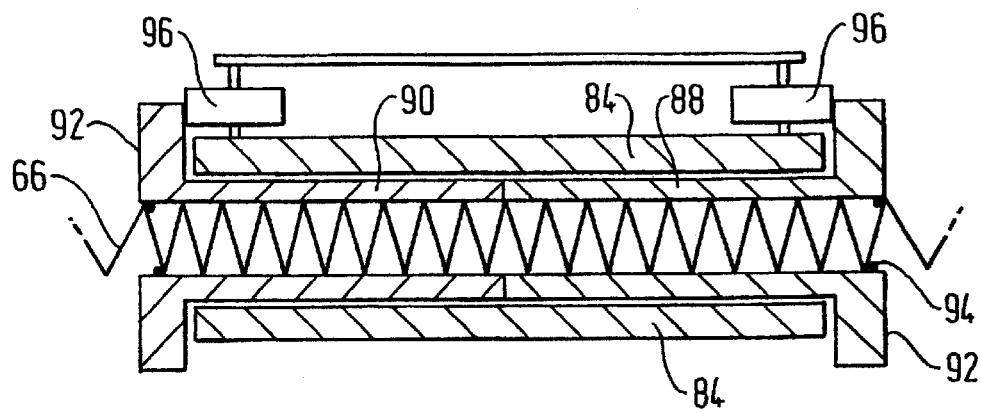
FIG. 14 is a section on the line F—F of FIG. 13.

FIG. 14 shows a section through one of the drive shafts of FIG. 13. This has an outer hollow cylindrical drive shaft 84 that extends around an inner shaft 86 that has two parts 88 and 90, each part 88, 90 comprising a hollow cylindrical shaft that has a lip 92 extending from one end. Projecting from an inner peripheral surface of each part 88 and 90 of the inner shaft, and at an end thereof, is a set of lugs 94 that is used for moving the spring 66.

The parts of the inner shaft 88 and 90 are mounted so that the cylindrical portions extend through the hollow outer shaft 84 and the lips 92 abut and extend beyond the ends of that shaft 84. The two parts 88 and 90 are interlocked so that they can move apart from each other but cannot rotate relative to the other. By installing the spring 66 so as to be permanently in tension between the opposing sets of lugs 94, the two parts 88 and 90 are held together in frictional engagement. This tension additionally forces the lips 92 of those parts into frictional engagement with the outer shaft 84 so that under normal circumstances when the outer shaft 84 is driven, the inner and outer shafts rotate together.

Figure 15:
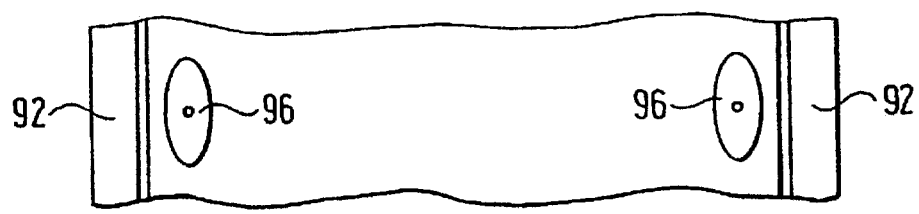
FIG. 15 is a top view of the shaft of FIG. 14 in a neutral position.
Figure 16:
FIG. 16 is similar to that of FIG. 15 except in a thrust position.

Mounted around the outer periphery of the outer shaft 84 and near the lips 92 of the inner shafts are two opposing elliptical wheels 96. These are selectively rotatable, for example, by means of small impulses from electromagnets, from a neutral position, as shown in FIG. 15, in which they do not engage either the inner or outer shafts, to a thrust position in which they engage the lips 92 of the inner shafts, as shown in FIG. 16. When in the thrust position, the elliptical wheels 96 touch the inner part of the lips 92 of the inner shafts, thereby frictionally binding the surfaces. Subsequent rotation of the elliptical wheels 96 forces the inner shafts out of engagement with the outer shaft 84. Further rotation returns the elliptical wheels 96 to the normal, neutral position, at which point the inner shafts are moved back into engagement with the outer shaft 84.

As before, the motor 68 drives the outer shaft of both of the hollow drive shafts A and B. When the elliptical wheels 96 of each drive are in their neutral position, frictional engagement between the inner and outer shafts causes the inner shafts 88 and 90 to rotate with the outer shafts 84, as shown in FIG. 12a, which in turn causes the endless spring 66 to be driven at one point by the hollow drive shaft A and simultaneously at another point by the second shaft B. Since the speed of each shaft is the same, this means that the speed at which the spring 66 moves is constant along its length and the output wheel drive 62 is driven at a constant speed by its engagement with the spring 66. If, however, the elliptical wheels are moved to their thrust position on one of the drive shafts A or B, this disengages the inner and outer shafts of that drive and stops rotation of the inner shaft, which in turn prevents further movement of the spring 66 through the shaft. This creates a difference in the speeds at which the spring is being driven at the two points, which causes a local expansion or contraction of the spring 66, which in turn causes a variation in the speed at which the output drive wheel 62 is driven.

For example, if the spring of FIG. 13 were to be driven in a clockwise manner, movement of the elliptical wheel 96 of shaft B to the thrust position would disengage the inner and outer shafts and prevent movement of the inner shaft. This prevents movement of the spring 66 through shaft B. Since the rate of movement of the spring 66 through shaft A is unchanged, however, this causes a shortening of the spring 66 on the drive wheel 62 and so a local increase in the tension of the spring. In this way, the speed of the drive wheel 62 is increased. When the elliptical wheels of shaft B are moved to their neutral position, the hollow drive shafts again run synchronously and the spring 66 returns to its equilibrium position.

In contrast, were the elliptical wheels 96 of drive A to be moved to the thrust position, this would prevent rotation of the inner shaft of drive A and so would slow or stop movement of the spring 66 at that point. Since the rate of movement of the spring 66 through shaft B is unchanged, however, this causes a lengthening of the spring 66 on the output drive wheel and so a local decrease in the tension of the spring. In this way, the speed of the wheel is decreased.

Use of the elliptical wheels 96 to move the inner shafts relative to the outer shaft 84 avoids the need to use high power actuators. This is advantageous. As an alternative, however, it would be possible to cause movement of the inner shafts away from the outer shaft using some form of hydraulic actuator.

Each of the drive systems previously described provides the possibility of continuously variable speed. There are, however, some applications in which it would be useful to have a simple automatic gear that can accelerate to a particular speed for a few moments and then stop, as for example in a car starter motor. One way to provide such a system is to have two drives connected by geared wheels of different sizes, the relative sizes depending on the time necessary to accelerate to the desired speed.

Figure 17:
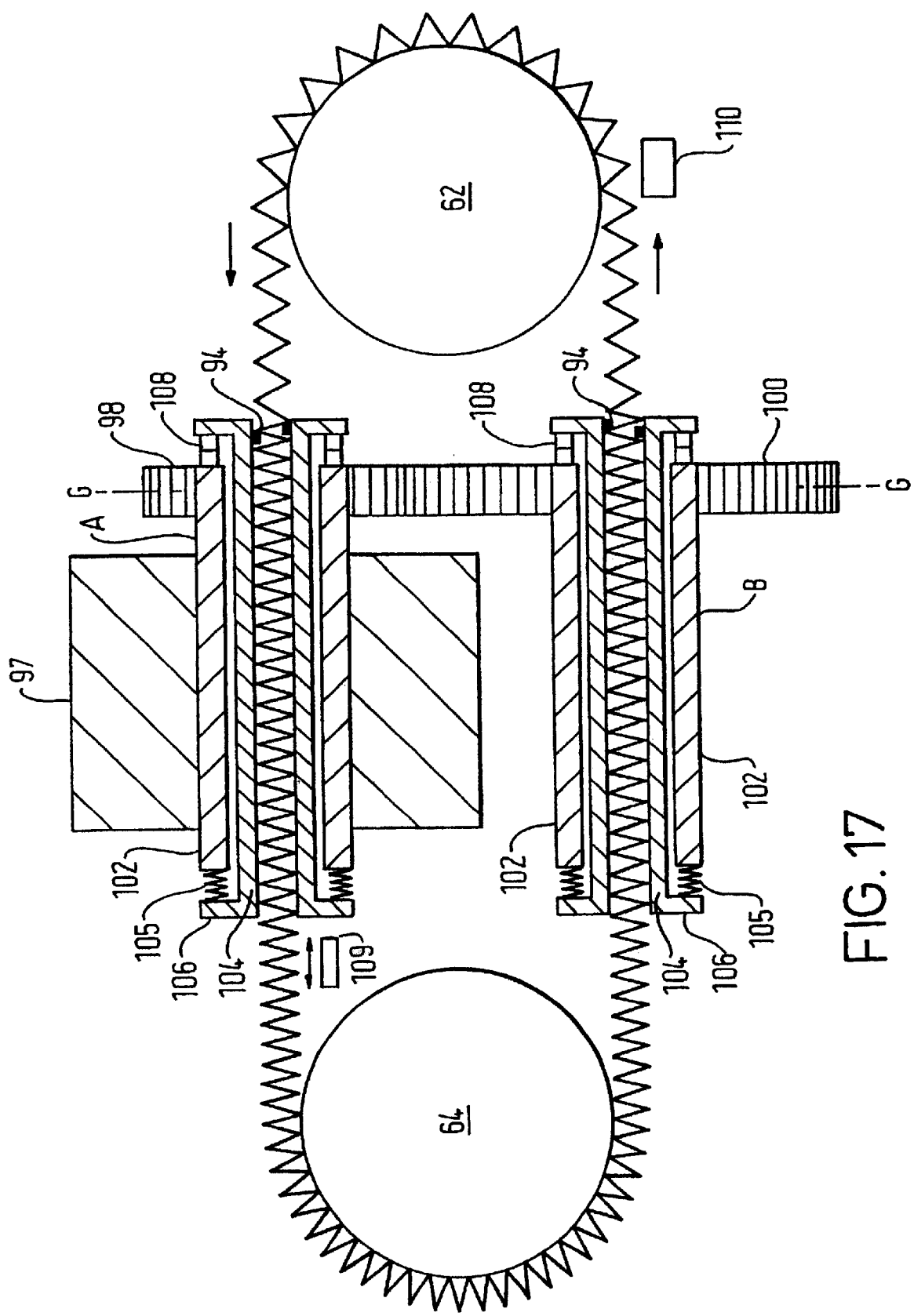
FIG. 17 is a section through yet another variable speed drive.

FIG. 17 shows a drive system that includes two opposing and substantially parallel hollow drive shafts A and B. At one end of the drive shafts A and B is provided an output drive wheel 62 and at the outer end a guide wheel 64. In operable engagement with drive A is a hollow shaft electric motor 97, which is arranged to drive shaft A. As before extending through each of the hollow shafts A and B, around the output drive wheel 62 and the guide wheel 64 is an endless extendible member 66, in this case a spring. The arrangement is such that the portions of the spring that extend through the hollow drive shaft are substantially parallel. As before, extending from inner peripheral surface of the inner shafts are sets of lugs 94 for driving the spring 66.

Figure 18:
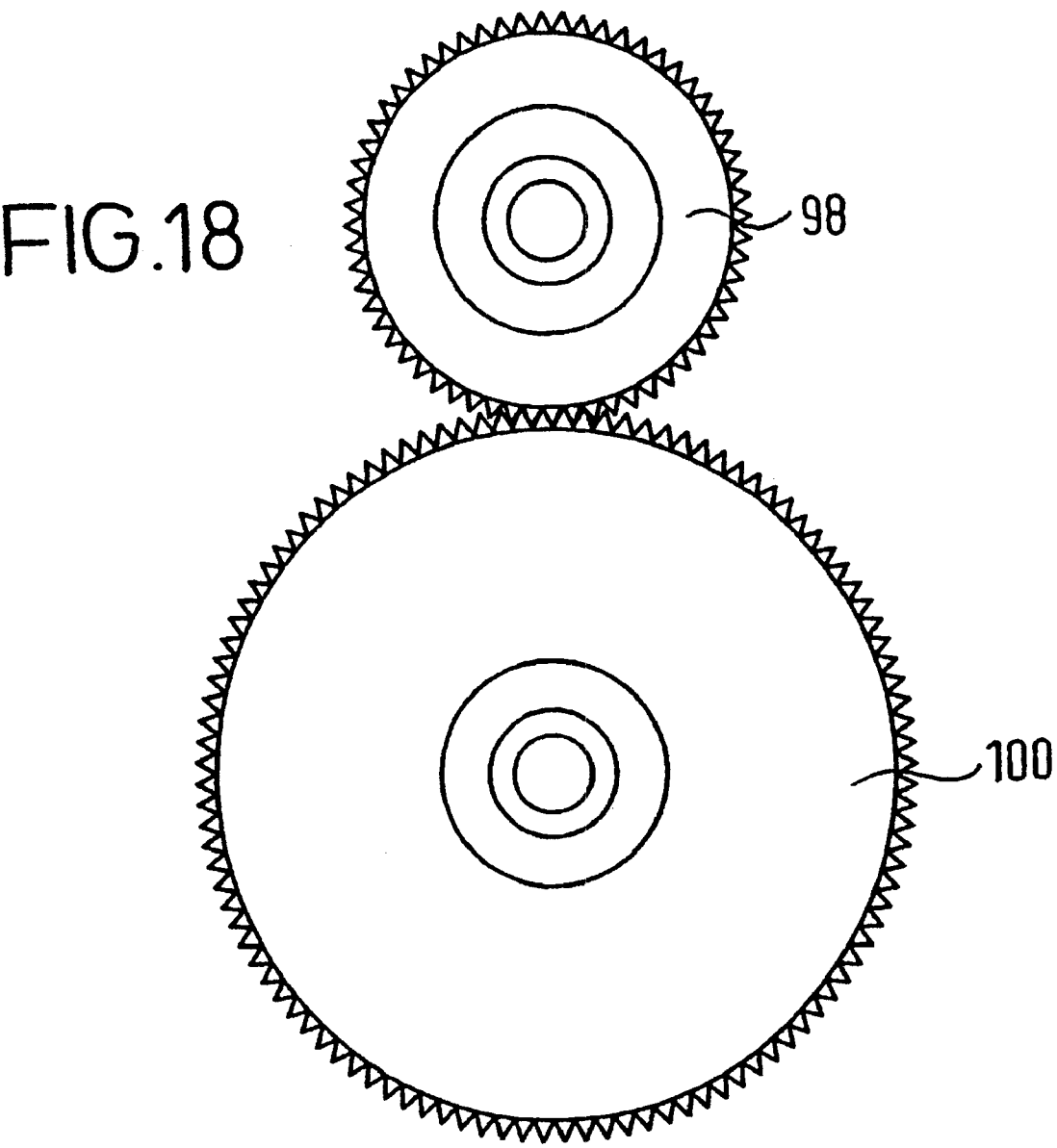
FIG. 18 is a section on the line G—G of FIG. 17.

Extending around each drive shaft A, B and attached thereto is a cog 98 and 100, which is adapted to mesh with the cog on the other shaft (see FIG. 18). The cog 98 that extends around shaft A has a smaller diameter than that which extends around shaft B. Since shaft A is connected to the electric motor 97, the smaller of the two cogs 98, i.e., the drive cog, can be driven, which in turn drives the larger one 100, i.e., the slave cog. Since the diameters of the cogs 98 and 100 are different, this means that the hollow drive shafts are rotated at different speeds. This gradually causes the coil 66 to be extended over the output drive wheel 62 causing it to run faster.

In order to prevent the spring extending indefinitely, each: drive shaft A, B is provided with means for automatically stopping further extension when a particular spring tension is reached. To this end, each drive shaft A, B comprises a cylindrical outer shaft 102 that extends around a longer cylindrical inner shaft 104 that is flanged at both ends. At one end of the inner shaft 104 are compression springs 105 that bear against its flange 106 and additionally the end of the outer shaft 102. At the other end of the inner shafts 104 are provided interlocking means 108 that interlock with like means on the end of the outer shaft 102, in such a way that the inner shaft 104 is longitudinally movable away from the outer shaft 102 and rotatable therewith thereto.

In the starting position, the outer and inner shafts 102 and 104 are interlocked so that rotation of the outer shaft 102 causes rotation of the inner shaft 104 and the spring 66 is evenly tensioned along its length. When the motor 97 is started, the drive cog 98 rotates at a first speed and drives the slave cog 100 at a second lower speed. This gradually causes the spring 66 to extend, which in turn causes the output drive wheel to move faster. When the spring 66 reaches a particular tension, the engagement of the spring 66 with the lugs 94 is sufficient to overcome the pulling action of the compression springs 105, which allows the inner shaft 104 to move forward out of engagement with the outer shaft 102. The inner shaft 104 gradually stops rotating and stops driving the spring 66 forward. This causes a reduction in the tension of the spring 66, until such time as the compression spring 105 is able to draw the inner shaft 104 back into engagement with the outer shaft 102, at which stage the process begins again. In this way, the extension of the spring 66 is automatically limited so that it does not become overly stressed and a drive is provided that accelerates and then maintains a constant speed.

Once the drive system has reached its desired speed and is no longer required, it can be switched off. It is however important that it be returned to the starting position for later use. In order to ensure this, an actuator 108 is provided. This actuator 108 is stimulated by the rising output of the main motor's generator (for example the dynamo of a car). It acts on the end of the inner shaft 104 of drive A nearest the compression spring 103 and pushes against the action of the compression spring 105, in order to de-couple the inner shaft 104 from its outer shaft 102. Connected to the actuator 108 and indeed to the electric motor 94 is a return to start detector 110, which is positioned adjacent to the output drive wheel 62. When drive A is de-coupled, drive B continues to feed the spring 66 around its closest path, which causes the tension of the spring 66 to loosen around the output drive wheel 62 until eventually the spring 66 is lifted off the output wheel 62. When this happens, the spring 66 abuts the return to start detector 110, which sends a signal that causes the actuator 108 and the motor 97 to switch off. In this way, the drive system is automatically returned to its start position.

Whilst the arrangement of FIG. 17 has a mechanical means, i.e., a spring, for decoupling the inner and outer shafts, it will be appreciated that a hydraulic actuator could be used.

The speed of the output drive wheels 62 of the systems shown in FIGS. 9, 13 and 17 is varied by driving the endless member 66 at one point on one side of the output wheel and either increasing or decreasing its speed, or stopping its movement altogether, at another point on the opposite side of the output wheel. This creates a local extension or contraction of the member and so varies its tension around the output drive shaft. This causes a variation in the output speed.

Figure 19:
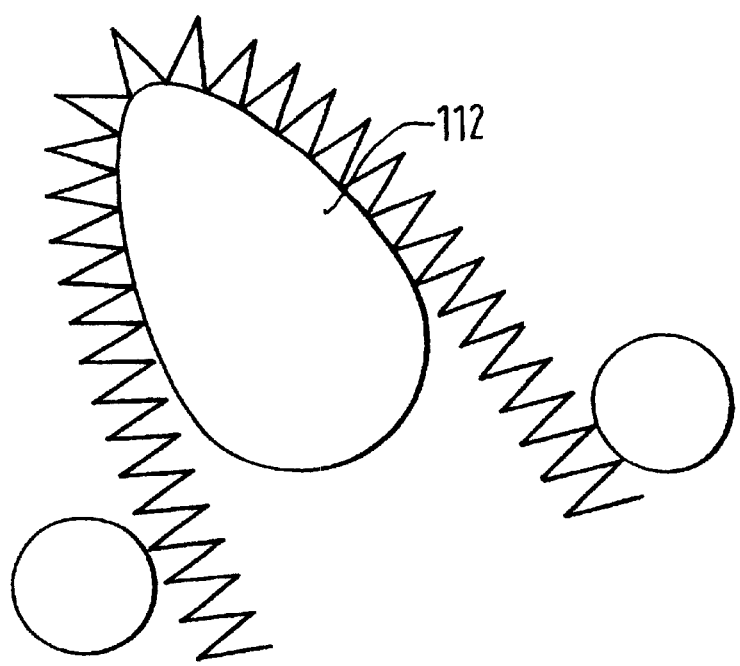
FIG. 19 is a plan view of a "pear" shaped drive shaft.
Figure 20:
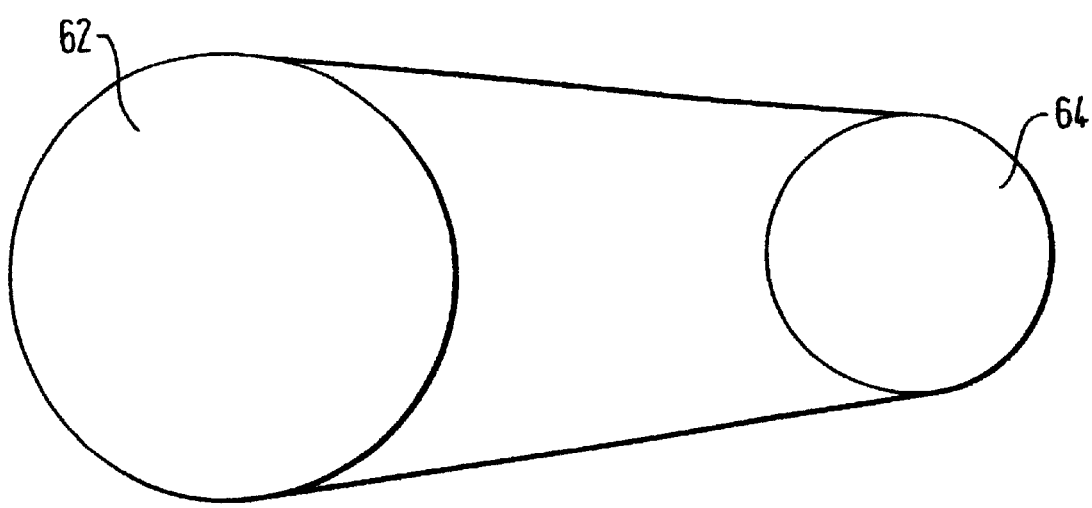
FIG. 20 is a plan view of a guide wheel/output drive wheel arrangement that can be used in the drive systems.

Whilst the output drive shafts of the previously described systems carry circular wheels, it will be appreciated that they may carry members of any suitable shape. For example, the output shaft may carry a "pear" shaped member 112, as shown in FIG. 19. This type of shaft would be useful for applications in which a non-uniform output power cycle is required, for example, in a high compression engine. In addition, whilst the output drive wheel 62 and the guide wheel 64 are shown as being of the same size, they could, of course, be different, as shown in FIG. 20. It may also be useful, particularly in the case where the guide wheel 64 and the output drive wheel 62 are different sizes, to use each as a drive depending on the speed requirements for particular applications. In this way, the drive system could have a low speed mode when the larger of the two wheels is used as the drive and a high speed output mode when the smaller of the two wheels is used as the drive. This would be useful, for example, for washing machine motors, which have to operate in a high "spin" mode and a lower speed normal mode.

Figure 21:
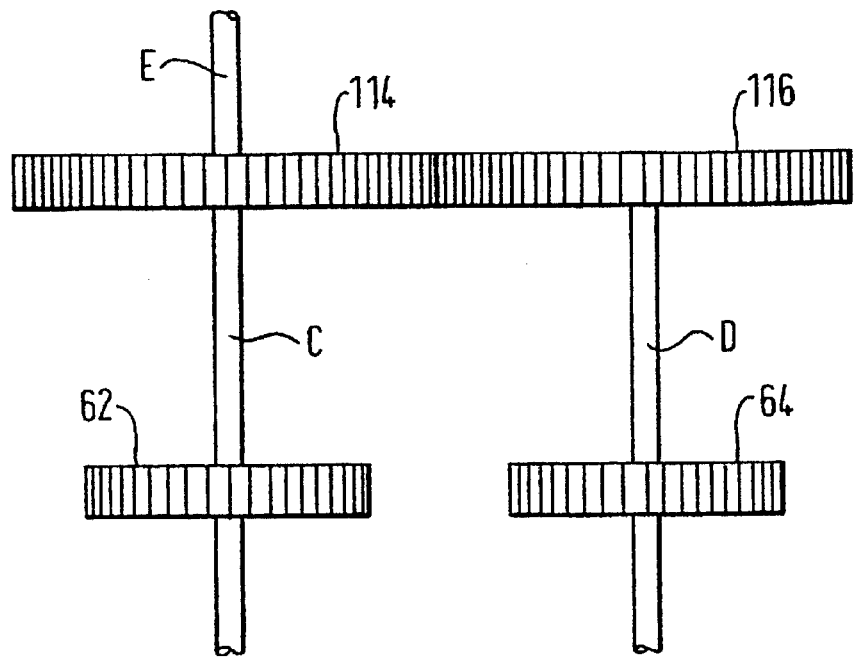
FIG. 21 is a section through another specific guide wheel/output drive wheel arrangement.
Figure 22:
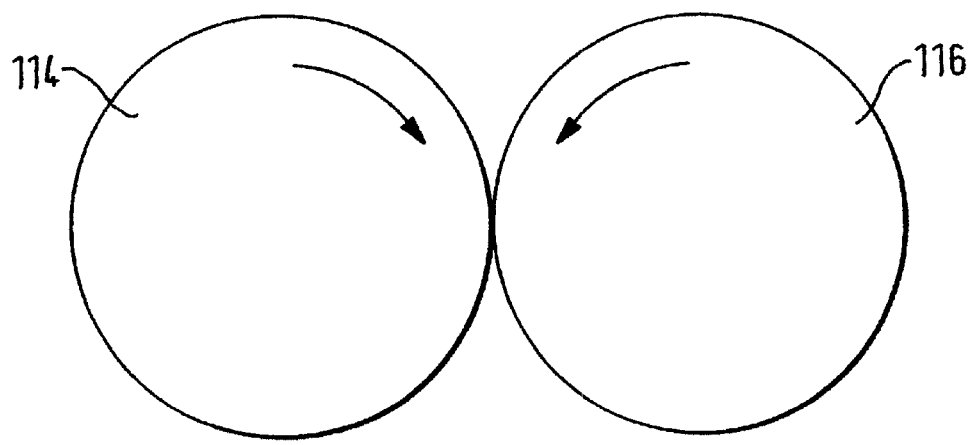
FIG. 22 is a top view of the arrangement of FIG. 21.

When the guide wheel 64 and the drive wheel 62 are each used as a drive, they may be coupled together using, for example, inter-meshing cogged wheels 114 and 166 that are mounted on their respective output shafts C and D respectively, as shown in FIG. 21. As will be appreciated, the cogged wheels are coupled together in such a manner that they rotate in opposite directions, as shown in FIG. 22. In this example, the ultimate output is only taken from shaft E. When the drive wheel 62 is being driven directly, the output on shaft E is rotated in a first direction. When the guide wheel 64 is driven directly, this causes rotation of cogged wheel 116, which in turn drives the other cogged wheel 114, but in the opposite direction to that when the output drive wheel is used as the main drive. In this way, the drive is fully reversible.

As will be appreciated, in each of the drives described above, the performance of a spring 28 varies depending on the profile of the steel used, the pitch and the diameter, as well as by the quality and thickness of the material used. The particular spring characteristics will depend on the desired application. For example, if the drive has to be very compact, the length of spring used should be relatively short. The spring 28, however, may be wound so that there is a sufficient gap between adjacent windings to receive the lugs of the motor. In addition, the spring 28 should preferably be circular in section before its ends are joined to form an endless path, in order to minimize energy loss through flexing in operation and decrease the torsion in the spring.

The drive wheels used in the variable speed drives described above could have slots formed in the surface that contacts with the spring 28. This reduces the likelihood of the spring slipping. This is more important at low drive wheel speed/spring speed ratios. At higher ratios, the increased spring tension is sufficient to avert slippage and the windings of the spring merely ride over the slots, or the angle at which the coil engages with the drive wheel is varied.

One application for the drive systems described above is a starter motor for use in conventional internal combustion engines. Such combustion engines have to be turned sufficiently fast to produce continuous firing of the cylinders. Considerable torque is required with modern high compression engines to achieve this. Conventionally, a powerful electric starter motor is used that requires solenoid switching of power to it and a heavy duty battery to provide the current fast enough. Electric motors provide mechanical output most efficiently at high revolutions per minute. However, in conventional systems, the starter engages with a large gear wheel in the engine and so the number of revolutions is reduced so that the engine is accelerated a little above its minimum revolutions per minute. In practice, however, more efficient and quicker starting would be achieved by accelerating the engine to a much higher revolutions per minute.

If a variable speed drive in which the invention is embodied were used as a starting motor, the size of that motor could be reduced, probably without the necessity for solenoid switching. This is because the spring drive acts as a reduction gear at low ratios so that the large gear wheel in the engine would not be required and the battery could also be greatly reduced in size. It is estimated that the variable speed drive in which the invention is embodied would be typically half the weight of a conventional starting motor. This is advantageous because it reduces the overall weight of the engine and the overall cost.

Because the variable speed drive in which the present invention is embodied is lighter than like prior art drives, this reduces vibration. This is highly advantageous. Another advantage of the invention is that friction is lower than in conventional drives. This improves the overall efficiency.

The drive in which the invention is embodied is suitable for use in many domestic machines, such as driers and washing machines that currently use electric motors with unnecessarily high power so that the speed can be controlled electrically. The drive in which the invention is embodied allows use of a less powerful motor.

It will be appreciated that the drive described above could be reversed to provide a generator, each of these machines operating on the same principle that speed is variable by varying the length of the flexible member or by driving the member at different rates at two different points, thereby to create a local extension or contraction of the member.

Whilst the motor described above is rotary, it will be appreciated that a linear or tubular motor could be used to drive the flexible member around its endless path. Furthermore, the flexible member could be a belt or a tube rather than a spring or coil. In this case, when a pulse phased linear or tubular electric motor is used as the drive, material (for example iron slugs) is provided at spaced intervals along the length of the member, which material is capable of being attracted or repelled magnetically by the motor. In this way, by pulsing the drive, the flexible member can be driven around its endless path. By measuring the separation of adjacent slugs in the vicinity of the output drive, the speed at the output can be determined. By comparing the separation of the slugs of the belt or tube on either side of the output drive, the actual rate of power transmitted can be calculated.

As will be appreciated, the principles of the invention, which have been disclosed by way of example only, can'be implemented in various ways. Those skilled in the art will readily recognize that modifications and changes can be made and it is not necessary to follow strictly the exemplary applications illustrated and described herein.

The invention claimed is:

1. A variable speed drive comprising a first driver, an output drive and an endless, extendible member that is driven by the first driver and extends around and drives the output drive, wherein the first driver is operable to drive the endless, extendible member at a first speed at a first driving position, and a second driver and brake system for changing a second speed or stopping movement of the endless, extendible member at a second driving position, thereby to cause local expansion or contraction of the endless, extendible member around the output drive without extending the overall length of the endless, extendible member.

2. A drive as claimed in claim 1, wherein the second driver and brake system is operable to reduce the speed of the endless, extendible member to substantially zero at one of the driving positions, so that the endless, extendible member is substantially prevented from moving past the one of the driving positions.

3. A drive as claimed in claim 1, wherein the endless, extendible member is an endless coil or spring or a belt or tube.

4. A variable speed drive as claimed in claim 3, wherein the endless, extendible member is an endless spring or coil, and the first driver comprises two hollow drive shafts.

5. A variable speed drive as claimed in claim 4, wherein the hollow drive shafts are driven by a motor.

6. A variable speed drive as claimed claim 4, wherein at least one lug depends from an inner peripheral surface of each hollow drive shaft for placement between adjacent windings of the spring or coil, so that when each hollow drive shaft is rotating the endless spring or coil is propelled forward by engagement of successive windings with the at least one lug.

7. A variable speed drive as claimed in claim 6, wherein the at least one lug is a pair of lugs, each lug of the pair of lugs being between adjacent windings of the endless spring or coil but offset from each other in such a manner that a first one of the pair of lugs contacts a forward one of the adjacent windings and a second one of the pair of lugs contacts a rearward one of the windings.

8. A variable speed drive as claimed in claim 6, wherein two or more lugs are provided opposite each other.

9. A variable speed drive as claimed in claim 4, wherein sets of lugs are provided at opposing ends of at least one of the two hollow drive shafts.

10. A variable speed drive as claimed in claim 4, wherein the two hollow drive shafts each comprise an inner hollow cylindrical shaft that is releasably coupled to an outer hollow cylindrical shaft driven by an output motor.

11. A variable speed drive as claimed in claim 10, wherein the second driver and brake system is operable to de-couple one of the inner hollow cylindrical shafts from a corresponding one of the outer hollow cylindrical shafts.

12. A variable speed drive as claimed in claim 11, wherein the second driver and brake system is hydraulically driven.

13. A variable speed drive as claimed in claim 11, wherein the second driver and brake system comprises a braking mechanism for braking movement of the one of the inner hollow cylindrical shafts, thereby to de-couple the one of the inner hollow cylindrical shafts from the corresponding one of the outer hollow cylindrical shafts so that one of the speeds of the endless spring or coil through the one of the inner hollow cylindrical shafts is reduced or brought to zero.

14. A variable speed drive as claimed in claim 11, wherein the second driver and brake system comprises a compression spring that is mounted between one end of the one of the inner hollow cylindrical shafts and one end of the one of the outer hollow cylindrical shafts, wherein the compression spring is operable to pull the one of the inner hollow cylindrical shafts into driving engagement with the one of the outer hollow cylindrical shafts up until a predetermined tension of the endless spring or coil is reached, at which stage the one of the inner hollow cylindrical shafts is moved out of engagement with the one of the outer hollow cylindrical shafts.

15. A variable speed drive as claimed in claim 14, comprising an actuator that is operable to sense when to switch off the first driver and move the one of the inner hollow cylindrical shafts against an action of the compression spring and out of engagement with the one of the outer hollow cylindrical shafts, thereby to de-couple the one of the inner hollow cylindrical shafts from the one of the outer hollow cylindrical shafts.

16. A variable speed drive as claimed in claim 15, wherein a detector is provided to detect a loosening of the endless spring or coil and switch off the output motor that drives the outer shaft, thereby to return the first driver to a starting position.

17. A variable speed drive as claimed in claim 10, wherein the one of the inner hollow cylindrical shafts has two separate but interlocking parts that can move longitudinally apart from each other, each of the parts being releasably mounted in driving engagement with one of the outer hollow cylindrical shafts, wherein the second driver and brake system includes a third driver for moving the parts of the one of the inner hollow cylindrical shafts from a driven position to a de-coupled position in which the parts of the one of the inner hollow cylindrical shafts are de-coupled from the one of the outer hollow cylindrical shafts.

18. A variable speed drive as claimed in claim 17, wherein the third driver is hydraulically driven.

19. A variable speed drive as claimed in claim 17, wherein the third driver comprises elliptical wheels that are rotatable into engagement with the parts of the one of the inner hollow cylindrical shafts, thereby to push the parts of the one of the inner hollow cylindrical shafts away from each other and out of driving engagement with the one of the outer hollow cylindrical shafts.

20. A variable speed drive as claimed in claim 1, wherein a drive member is provided on the output drive, the endless, extendible member being wound around the drive member.

21. A variable speed drive as claimed in claim 20, wherein the drive member is circular.

22. A variable speed drive as claimed in claim 20, wherein the drive member is pear shaped.

23. A variable speed drive as claimed in claim 1, wherein at least one detector is provided for detecting an expansion or contraction of the endless, extendible member, and thereby changes in an output drive speed of the output drive.

24. A variable speed drive as claimed in claim 23, wherein when the endless, extendible member is a spring, the at least one detector is operable to monitor separation of adjacent windings to thereby gain a measure of expansion or contraction of the spring and a spring speed of the spring.

25. A variable speed drive as claimed in claim 24, wherein the at least one detector is two detectors on opposing sides of the output drive, and further including a comparator for comparing the separation of the windings to thereby calculate a rate of power transmitted.

26. A variable speed drive comprising a first driver, an output drive and an endless, extendible member that is driven by the first driver and extends around and drives the output drive, wherein the first driver is operable to drive the endless, extendible member at a first speed at a first driving position, and a second driver and brake system for changing a second speed or stopping movement of the endless, extendible member at a second position, thereby to cause local expansion or contraction of the endless, extendible member around the output drive, wherein the first driver comprises a hollow drive shaft on which is provided a lug for interacting with the endless, extendible member thereby to move it.

27. A variable speed drive comprising a driving system, an output drive and an endless, extendible member that is driven by the driving system and extends around and drives the output drive, wherein the driving system comprises first drives operable to drive the endless, extendible member at a first speed at a first position and a second driver operable to drive the endless, extendible member at a second speed at a second position, thereby to cause local expansion or contraction of the endless, extendible member around the output drive.

28. A variable speed drive comprising an input drive, a movable member, an output drive and an endless, extendible member that is driven by the input drive and extends around the output drive and the movable member, wherein movement of the endless, extendible member over the output drive causes the output drive to move and movement of the moveable member expands or contracts the endless, extendible member, thereby varying an overall length of the endless, extendible member to vary a speed at which the output drive is driven, wherein the input drive comprises a hollow drive shaft on which is provided a lug for interacting with the endless, extendible member to move the endless, extendible member.

29. A variable speed drive as claimed in claim 28, wherein the movable member comprises two spaced apart moveable locating members, the endless, extendible member being located between the locating members, the locating members being fixedly mounted relative to each other and movable relative to the input drive such that when the locating members are moved in one direction, the endless, extendible member is caused to engage a first one of the locating members and is able to move a drive shaft in a first direction, and when moved in another direction, the endless, extendible member is caused to engage a second one of the locating members and is able to move the drive shaft in a second direction, thereby to provide a reversible drive.

30. A variable speed drive as claimed in claim 28, wherein the movable member comprises a wheel.

31. A variable speed drive as claimed in claim 28, wherein the endless, extendible member is a spring or coil.

32. A variable speed drive as claimed in claim 31, wherein the lug depends from an internal wall of the hollow drive shaft for placement between windings of the spring or coil, so that when the hollow drive shaft is rotating, the spring or coil is propelled forward by engagement of successive windings with the lug.

33. A variable speed drive as claimed in claim 32, wherein two or more lugs are provided.

34. A variable speed drive as claimed in claim 33, wherein the lugs are provided with a roller bearing that provides a surface for engagement with the windings of the spring or coil, thereby to reduce friction.

35. A variable speed drive as claimed in claim 31, wherein a drive wheel is provided on the output drive, the endless, extendible member being wound around the drive wheel.

36. A variable speed drive as claimed in claim 31, wherein a detector is provided for detecting any expansion or contraction of the endless, extendible member, and thereby changes in the speed of the output drive and rate of transmission of power to the output drive.

37. A variable speed drive as claimed in claim 36, wherein the detector is operable to monitor separation of adjacent windings of the spring or coil, thereby to gain a measure of expansion or contraction of the spring or coil.

38. A variable speed drive as claimed in claim 28, wherein the endless, extendible member is an elastic belt or tube.

39. A variable speed drive as claimed in claim 38, wherein the input drive is a linear electric motor.

40. A variable speed drive as claimed in claim 39, wherein material is mounted at regularly spaced intervals along a length of the belt or tube, wherein the material is capable of being attracted and/or repelled magnetically.

41. A variable speed drive comprising an input drive, a movable member, an output drive and an endless, extendible member that is driven by the input drive and extends around the output drive and the movable member, wherein movement of the endless, extendible member over the output drive causes the output drive to move and movement of the moveable member expands or contracts the endless, extendible member, thereby varying an overall length of the endless, extendible member, and so varying a speed at which the output drive is driven, wherein the endless, extendible member is an elastic belt or tube with material mounted at regularly spaced intervals along the elastic belt or tube wherein the material is capable of being attracted and/or repelled magnetically and the input drive is a linear electric motor.

42. A drive comprising an input drive, an output drive and an endless, extendable member that is driven by the input drive and extends around the output drive, the input drive comprising a hollow drive shaft, through which the extendable member extends, the hollow drive shaft being operable to rotate around a circumference of the extendable member, thereby to drive the extendable member.

* * * * *

UNITED STATES PATENT AND TRADEMARK OFFICE
CERTIFICATE OF CORRECTION

PATENT NO.   : 6,508,733 B2  
DATED        : January 21, 2003  
INVENTOR(S)  : John Philip Roger Hammerbeck It is certified that error appears in the above-identified patent and that said Letters Patent is hereby corrected as shown below:

Column 4,  
Line 45, "arrow C" should be -- arrow B --.  
Line 46, "Fig. 8" (second occurrence) should be -- Fig. 6 --.

Column 5,  
Line 19, "Fig. 3(b)" should be -- Fig. 3b --.

Column 6,  
Line 63, "forwards" should be -- forward --.

Column 7,  
Line 32, "shoes" should be -- shows --.

Column 12,  
Line 53, delete "a".

Column 13,  
Line 64, after "claimed" insert -- in --.

Signed and Sealed this

Twenty-second Day of April, 2003

JAMES E. ROGAN  
*Director of the United States Patent and Trademark Office*